United States Patent [19]
Ishihara et al.

[11] Patent Number: 6,064,565
[45] Date of Patent: May 16, 2000

[54] LCD ASSEMBLY AND INFORMATION PROCESSING APPARATUS

[75] Inventors: Yoshihisa Ishihara, Yamato; Seita Horikoshi, Zama; Tetsuo Ogawa, Sagamihara, all of Japan

[73] Assignee: International Business Machines Corporation, Armonk, N.Y.

[21] Appl. No.: 09/114,797

[22] Filed: Jul. 13, 1998

[30] Foreign Application Priority Data

Sep. 4, 1997 [JP] Japan ................................ 9-240051

[51] Int. Cl.⁷ .......................... H05K 5/00; G02F 1/1333; G02F 1/3335
[52] U.S. Cl. .......................... 361/681; 361/682; 345/905; 248/917
[58] Field of Search ..................... 361/683, 682, 361/681; 345/905; 248/917; 40/530

[56] References Cited

U.S. PATENT DOCUMENTS

| | | | |
|---|---|---|---|
| 5,268,816 | 12/1993 | Abell, Jr. et al. | 361/729 |
| 5,379,182 | 1/1995 | Fujimori et al. | 361/681 |
| 5,422,751 | 6/1995 | Lewis et al. | 359/83 |
| 5,566,048 | 10/1996 | Esterberg et al. | 361/681 |
| 5,568,357 | 10/1996 | Kochis et al. | 361/681 |
| 5,570,267 | 10/1996 | Ma | 361/681 |
| 5,583,529 | 12/1996 | Satou | 345/87 |
| 5,806,940 | 9/1998 | Heirich | 312/7.2 |
| 5,835,139 | 11/1998 | Yun et al. | 349/58 |
| 5,844,774 | 12/1998 | Gushiken et al. | 361/681 |

*Primary Examiner*—Leo P. Picard
*Assistant Examiner*—Anatoly Vortman
*Attorney, Agent, or Firm*—J. P. Sbrollini

[57] ABSTRACT

A liquid crystal display unit has at least one of the screw securing elements on its right and left sides to attach to brackets for attachment to the cover for a laptop computer. When the liquid crystal display unit is fixed to the cover from the side in this manner, the cover can be near that of the size of the liquid crystal display panel.

9 Claims, 6 Drawing Sheets

LCD ASSEMBLY AND INFORMATION PROCESSING APPARATUS

FIELD OF THE INVENTION

The present invention relates to a display assembly being constituted by liquid crystal and a light conducive plate for guiding light to liquid crystal across the entire face of the display device, and in particular, to a display assembly rotatably hinged with an information processing apparatus. More specifically, the present invention pertains to a display assembly that contributes to an increase in the size of the area occupied by the liquid crystal.

BACKGROUND OF THE INVENTION

In accordance with recent technological developments, various type personal computers, such as desktops, towers and notebooks, have been produced and are being sold. Among them, notebook computers are battery-operated personal computers designed while taking portability into consideration.

In general, a notebook computer has a "clam shell" structure constituted by the main body of the device and a lid member rotatably hinged at the rear edge of the main body. The main body of the device incorporates, for example, a motherboard on which a CPU, a memory and peripheral controller chips are mounted. Various peripheral devices, such as a hard disk drive (HDD), a floppy disk drive (FDD) and a CD-ROM drive (none of them shown) are also accommodated into the main body. Further, a keyboard unit having a plurality of keys is provided on the top face of the main body. A pointing device, such as a "TrackPoint," may be mounted on the keyboard unit. A liquid crystal display (LCD) unit having a diagonal measurement of greater than ten and less than twenty inches is embedded in the lid member. FIG. 5 shows the outlook design of a conventional notebook computer.

A user of a notebook computer opens its lid member relative to the main body, so as to use the keyboard and the display device. When the user carries or stores the notebook computer, he or she closes the lid member against the main body with the keyboard and the surface of the display device inside, so that they can be protected from unexpected impacts.

As is well known to those having ordinary skill in the art, it is preferable for portability that a notebook computers be small. That is, a smaller footprint and thinner bottom area of the notebook computer is better. Ordinarily, the thickness of the computer is determined by the thicknesses of the circuit components and the peripheral devices accommodated into the main body of a computer, and the footprint also depends on the arrangement of the respective circuit components and the peripheral devices and the area coupled by the LCD unit in the lid member.

Lately, as improved liquid crystal fabrication techniques have become available, notebook computers having LCD units of greater than 12 inches are no longer a rarity (the LCD unit sizes are the diagonal widths in inches of the display screens). As the size of LCD displays increase, the footprints of notebook computers will grow proportionately.

FIG. 6 shows the assembly of the lid member of a notebook computer. Screws are inserted, in the direction indicated by the lines, into the LCD unit plane at five places: at the upper and lower corners on the left side, and at upper and lower positions and at the center along the right side edge, so that the LCD unit is secured to a rear cover. Hinges are mounted at the right and left ends of the rear cover, and the other ends of the hinges are attached the main body of the computer (not shown), so that the lid member can be rotatably supported by the main body.

In FIG. 6, the footprint of the lid member is extended outward from the circumferential edge of the LCD unit by a volume the equivalent in size of the area into which the screws are inserted, i.e., that corresponds to the sizes of the heads of the screws.

In this example, since the LCD unit is directly attached to the rear cover, when the cover is opened or closed a twisting force is directly imposed on the LCD unit. That is, the LCD unit may be damaged when external force is applied to it. Especially when the rear cover is made of a less rigid material, such as plastic, the load imposed on the LCD unit would be increased.

Furthermore, in this example, since the LCD unit is secured to the rear cover separately from the hinges, the number of the screws required is increased, and the assembly process is more complex.

It is, therefore, one object of the present invention to provide a superior display assembly in which is mounted a liquid crystal display (LCD) unit constituted by liquid crystal, and a light conductive plate for guiding light.

It is another object of the present invention to provide a superior display assembly that is rotatably hinged upon an information processing apparatus.

It is an additional object of the present invention to provide a display assembly that contributes to an increase in the size of the liquid crystal.

SUMMARY OF THE INVENTION

To achieve the above objects, according to a first aspect of the present invention, a display assembly rotatably hinged upon the main body of an information processing apparatus, comprises: (a) a liquid crystal display unit having a flat display panel and a light conductive plate; (b) a plurality of screw securing portions provided on the right and left sides of the liquid crystal display unit; (c) a pair of brackets to be secured by screws to the right and left sides of the liquid crystal display unit and having through holes formed at locations corresponding to the screw securing portions; (d) a pair of hinge members, each hinge member having one end fixed to the lower end of the bracket and the other end rotatably coupled with the main body of the information processing apparatus; (e) a rear cover for covering the rear face of the liquid crystal display unit, to which the brackets are attached; and (f) a through hole formed in a location corresponding to at least one of the screw securing portions on the right and left side of the rear cover.

According to a second aspect of the present invention, a display assembly rotatably hinged upon the main body of an information processing apparatus, comprises: (a) a light source; (b) a liquid crystal display unit having a flat display panel and a light conductive plate; (c) a plurality of screw securing portions provided on the right and left sides of the liquid crystal display unit; (d) a pair of brackets to be screwed to the right and left sides of the liquid crystal display unit and having through holes formed at locations corresponding to the screw securing portions; (e) a pair of hinge members, each hinge member having one end fixed to the lower end of the bracket and the other end rotatably coupled with the main body of the information processing apparatus; (f) a rear cover for covering the rear face of the liquid crystal display unit and supporting the light source, to which the brackets are attached; and (g) a through hole formed in a location corresponding to at least one of the screw securing portions on the right and left side of the rear cover.

In a display assembly according to the first and the second aspects, the liquid crystal display unit may be attached to the pair of brackets by screwing attachment components through the through holes formed in the brackets, and may be attached to the rear cover by securing attachment components through the through holes formed in the right and left side of the rear cover.

According to a third aspect of the present invention, a display assembly rotatably hinged upon the main body of an information processing apparatus, comprises: a liquid crystal display unit having a flat display panel and a light conductive plate; and a box-shaped rear cover for covering the liquid crystal display unit, the liquid crystal display unit being secured by screws to the side walls of the rear cover.

According to a fourth aspect of the present invention, provided is an information processing apparatus having a main body for accommodating electronic components and a lid member rotatably hinged at one edge of the main body, the lid member comprises: (a) a liquid crystal display unit having a flat display panel and a light conductive plate; (b) a plurality of screw securing portions provided on the right and left sides of the liquid crystal display unit; (c) a pair of brackets to be secured by screws to the right and left sides of the liquid crystal display unit and having through holes formed at locations corresponding to the screw securing portions; (d) a pair of hinge members, each hinge member having one end fixed to the lower end of the bracket and the other end rotatably coupled with the main body of the information processing apparatus; (e) a rear cover for covering the rear face of the liquid crystal display unit, to which the brackets are attached; and (f) a through hole formed in a location corresponding to at least one of the screw securing portions on the right and left side of the rear cover.

According to a fifth aspect of the present invention, provided is an information processing apparatus having a main body for accommodating electronic components and a lid member rotatably hinged at one edge of the main body, the lid member comprises: (a) a light source; (b) a liquid crystal display unit having a flat display panel and a light conductive plate; (c) a plurality of screw securing portions provided on the right and left sides of the liquid crystal display unit; (d) a pair of brackets to be screwed to the right and left sides of the liquid crystal display unit and having through holes formed at locations corresponding to the screw securing portions; (e) a pair of hinge members, each hinge member having one end fixed to the lower end of the bracket and the other end rotatably coupled with the main body of the information processing apparatus; (f) a rear cover for covering the rear face of the liquid crystal display unit and supporting the light source, to which the brackets are attached; and (g) a through hole formed in a location corresponding to at least one of the screw securing portions on the right and left side of the rear cover.

In an information processing apparatus according to the fourth and the fifth aspects, the liquid crystal display unit may be attached to the pair of brackets by screwing attachment components through the through holes formed in the brackets, and may be attached to the rear cover by securing attachment components through the through holes formed in the fight and left side of the rear cover.

According to a sixth aspect of the present invention, provided is an information processing apparatus having a main body for accommodating electronic components and a lid member rotatably hinged at one edge of the main body, the lid member comprises: a liquid crystals display unit having a flat display panel and a light conductive plate; and a box-shaped rear cover for covering the liquid crystal display unit, the liquid crystal display unit being secured by screws to the side walls of the rear cover.

In an information processing apparatus according to the fourth to the sixth aspects, a keyboard unit having a plurality of keys may be provided on the top face of the apparatus.

According to the individual aspects of the present invention, for the liquid crystal display unit, at least one of the screw securing portions provided on the right and left sides is employed to attach the brackets on the right and left sides. The screw securing portions are nuts with internally formed threads, and attachment components may be male screws whose threads attach the internally formed threads in the nuts (the same thing can be applied hereinafter).

A liquid crystal display unit, to which brackets are attached to the right and left sides, is covered by the rear cover and is fixed thereto by inserting the attachment components through the through holes formed in the right and left sides of the rear cover. The thus fabricated liquid crystal display unit and the rear cover constitute the lid member of the information processing apparatus.

The other ends of a pair of hinge members fixed at the lower ends of the respective brackets are connected to the main body of the information processing apparatus (e.g., at the rear edge of the main body). The lid member can thus be opened and closed relative to the main body. That is, for use, the lid member is released from the main body, and for carrying or storage, the lid member is closed so that the main body is covered and the apparatus is flat.

Since the liquid crystal display unit is held by screws from the side, not from the top of the display face (i.e., in the normal direction), the design of the surface of the lid member is simplified. Further, since screw holes (i.e., attachment holes) need not be formed in the display face, the area of the lid member can be near that of the size of the liquid crystal display panel. That is, a savings can be realized in the size of the footprint.

Since the individual brackets are attached at the sides of the liquid crystal display unit, the torque exerted when the lid member is opened or closed is received in the widthwise direction of the brackets. In other words, the brackets accept the force exerted when the lid is opened and closed, the load placed on the LCD unit can thus be reduced and the mechanical strength of the lid member can be increased. In addition, since the liquid crystal display unit is attached to the rear cover as to sandwich the brackets, the strength is further increased.

BRIEF DESCRIPTION OF THE DRAWINGS

Other objects, features, and advantages of the present invention will be apparent in the detailed description of the preferred embodiment of the present invention which will be given while referring to the accompanying drawings in which.

PREFERRED EMBODIMENT

Figure 1:
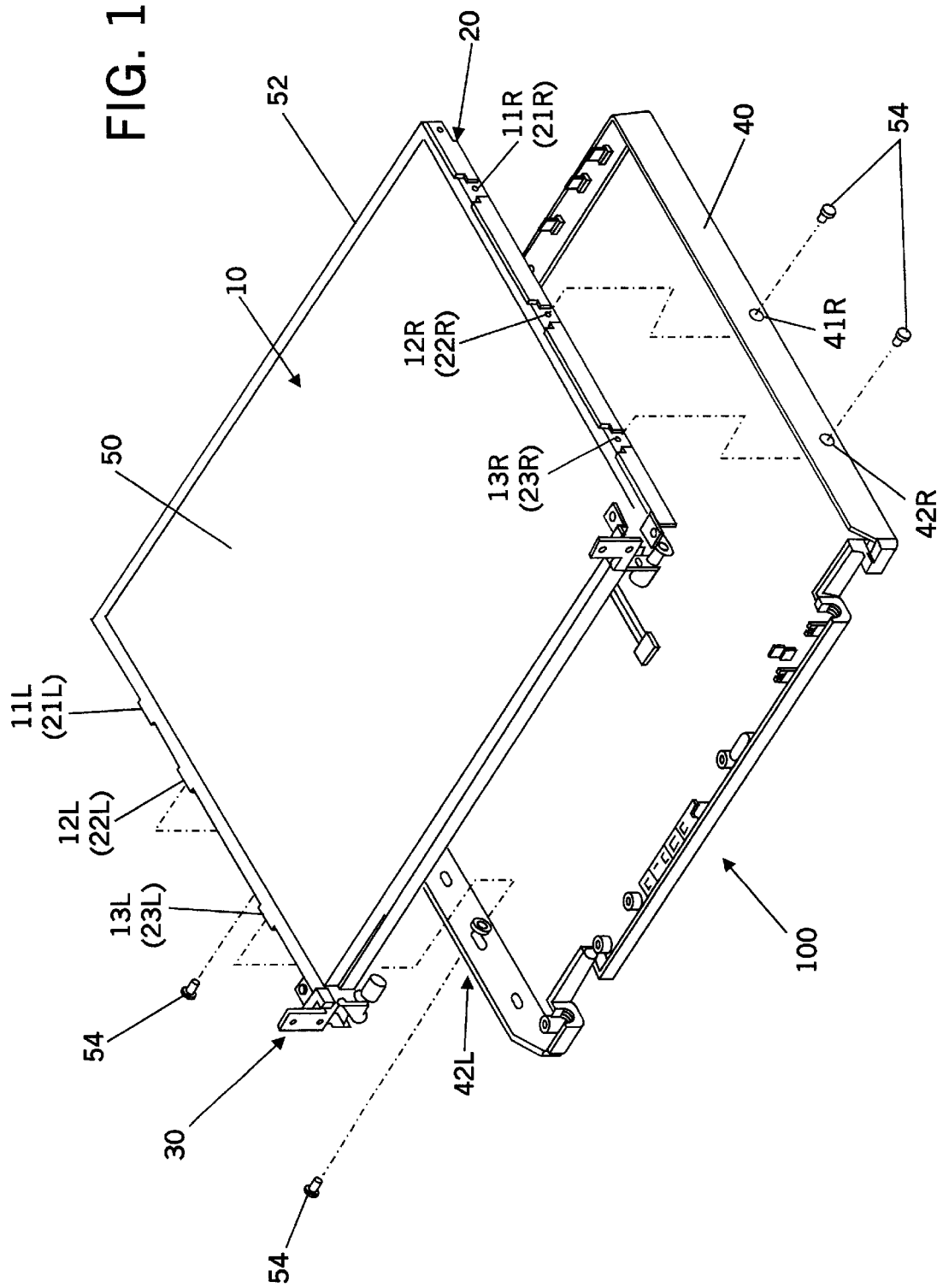
FIG. 1 shows the construction of a liquid crystal display assembly 100 according to the present invention.

FIG. 1 shows a construction of a liquid crystal display (LCD) assembly 100. The LCD assembly 100 constitutes a lid member of a notebook computer (not shown) having a clam shell structure, and is rotatably supported at the rear edge of the main body.

The LCD assembly 100 comprises an LCD unit 10, a right hinge member 20, a left hinge member 30 and a rear cover 40.

The LCD unit 10 includes an LCD panel that is driven in accordance with display data transmitted from the computer a thin rectangular frame 52 conformally surrounding the panel, and a light source (CFL) for irradiating the display data onto the front face 50 of the LCD panel. Further, a laminated diffusion sheet and light conductive plate diffuse and guide the light emitted by the light source across the entire LCD panel. Three threaded holes screw securing portions 11R(L), 12R(L) and 13R(L) are formed in either, right and left, side of the LCD unit 10 to engage screws. The LCD unit 10 in this embodiment is, for example, 14 inches diagonally, and consists of 1024×768 matrix pixels.

The right hinge member 20 and the left hinge member 30 are used to support the right and left sides of the LCD unit 10. In this embodiment, the right hinge member 20 and the left hinge member 30 have substantially symmetrical shapes and structures. The hinge members 20 and 30 are each constituted by an upper bracket 25 attached to either side of the LCD unit 10, a lower bracket attached to the main body of the notebook computer (not shown), and a hinge joint that hinges both brackets using a predetermined rotational torque (see FIG. 2; which will be described later). For the upper bracket of the hinge member 20(30), through holes 21R(L), 22R(L) and 23R(L) for the insertion of screws are formed at positions corresponding to the threaded holes 11R(L), 12R (L) and 13R(L) on the frame 52 of the LCD unit 10. The attachment of the LCD unit 10 and the hinge members 20 and 30 will be described later while referring to FIG. 2.

The rear cover 40 is a box-shaped component that accommodates the LCD unit 10 therein and covers it from the rear, and that constitutes one part of the case of the notebook computer. The rear cover 40 is made, for example, a plastic or a magnesium alloy, and its surface is painted black. As is shown in FIG. 1, a through hole 41R(L) and 42R(L), for insertion of screws 54, are formed in the either wall of the rear cover at positions corresponding to the threaded holes 12R(L) and 13R(L) of the LCD unit 10. As is shown in FIG. 1, screws are inserted through the through holes 41R(L) and 42R(L) and engage the threaded holes 12R(L) and 13R(L), so that the LCD unit 10 is fixed to the rear cover 40. Since the LCD unit 10 is not secured by screws entering from the top of the display face, but from the sides, there are not screw holes in the display face of the lid member. The design of the lid member, therefore, is simplified because there are not screw heads on the display face. In addition, since for attachment no extra extensions are required on the display face, the size of the rear cover 40 can be near that of the LCD unit 10, and the size of the footprint of the main body can be reduced.

In this embodiment, no through holes are formed at the position corresponding to the threaded hole 11R(L) on the right or left wall of the rear cover 40. The threaded holes 11R and 11L are reserved for the attachment of the hinge members 20 and 30 to the LCD unit 10 (which will be described later).

Figure 2:
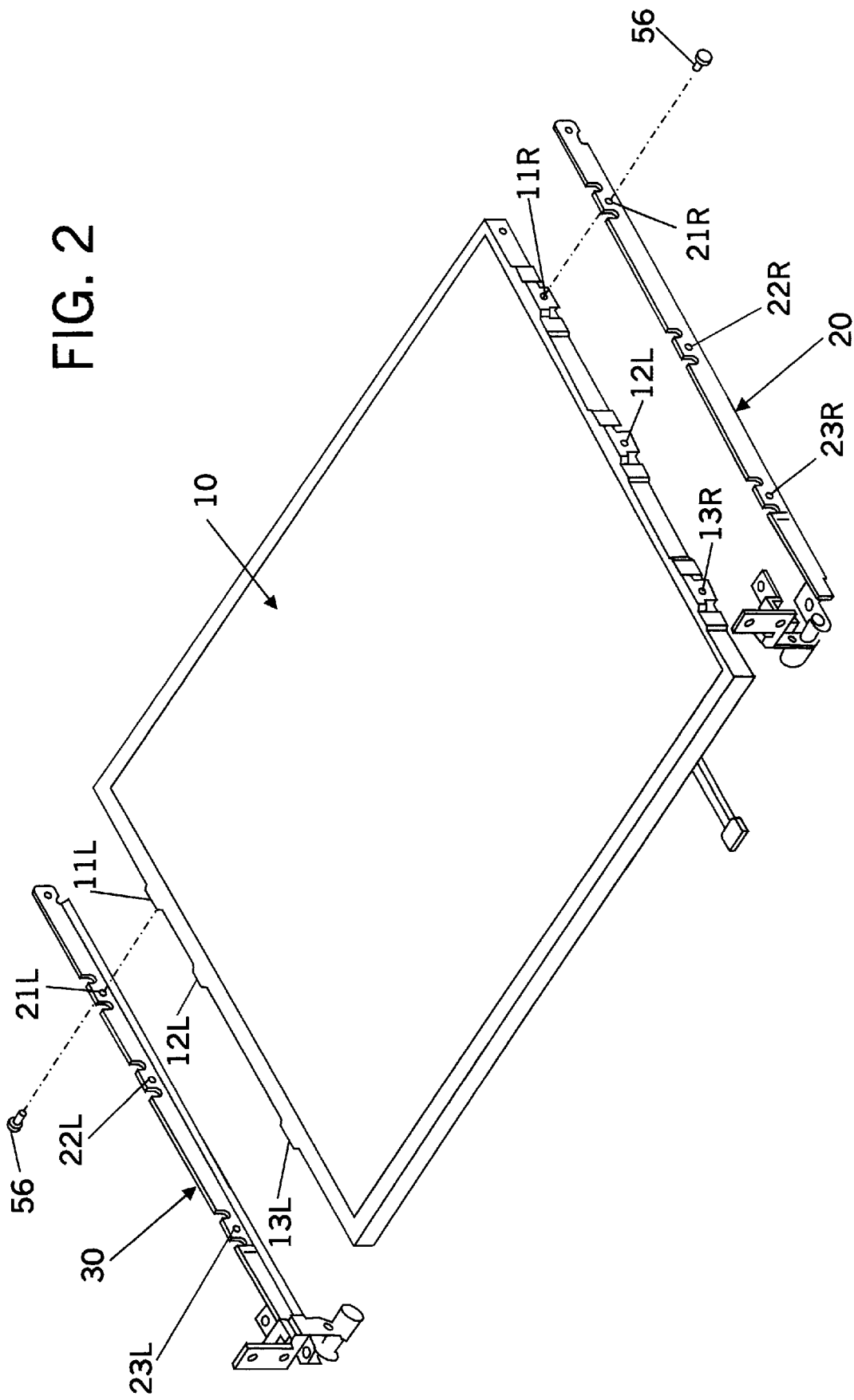
FIG. 2 shows the attached of right and left hinge members 20 and 30 to an LCD unit 10.

FIG. 2 shows the attachment of the hinge members 20 and 30 to the LCD unit 10.

As was previously described while referring to FIG. 1, the screws, inserted through the through holes 41R(L) and 42R(L) in the either wall of rear cover 40, engage the threaded holes 12R(L) and 13R(L) of the LCD unit 10 across the through holes 22R(L) and 23R(L) of the hinge member 20 and 30. The remaining through holes 21R and 21L are used for the screws that engage the threaded holes 11R and 11L in order to fix the hinge members 20 and 30 to the LCD unit 10 (see FIG. 2). Since the LCD unit 10 and the hinge members 20 and 30 are held temporarily before the LCD unit 10 is inserted into the rear cover 40, the assembly is facilitated.

Since a rotational torque acts, in the widthwise direction, on the upper bracket of the hinge member 20, the force is seldom applied in a twisting direction. The mechanical strength of the LCD 10 can be increased in comparison with the above described conventional example where the rotational torque acts directly on the LCD unit. Further, since the LCD unit 10 is so attached to the rear cover 40 that it sandwiches the upper bracket, the strength can be further increased.

Figure 3:
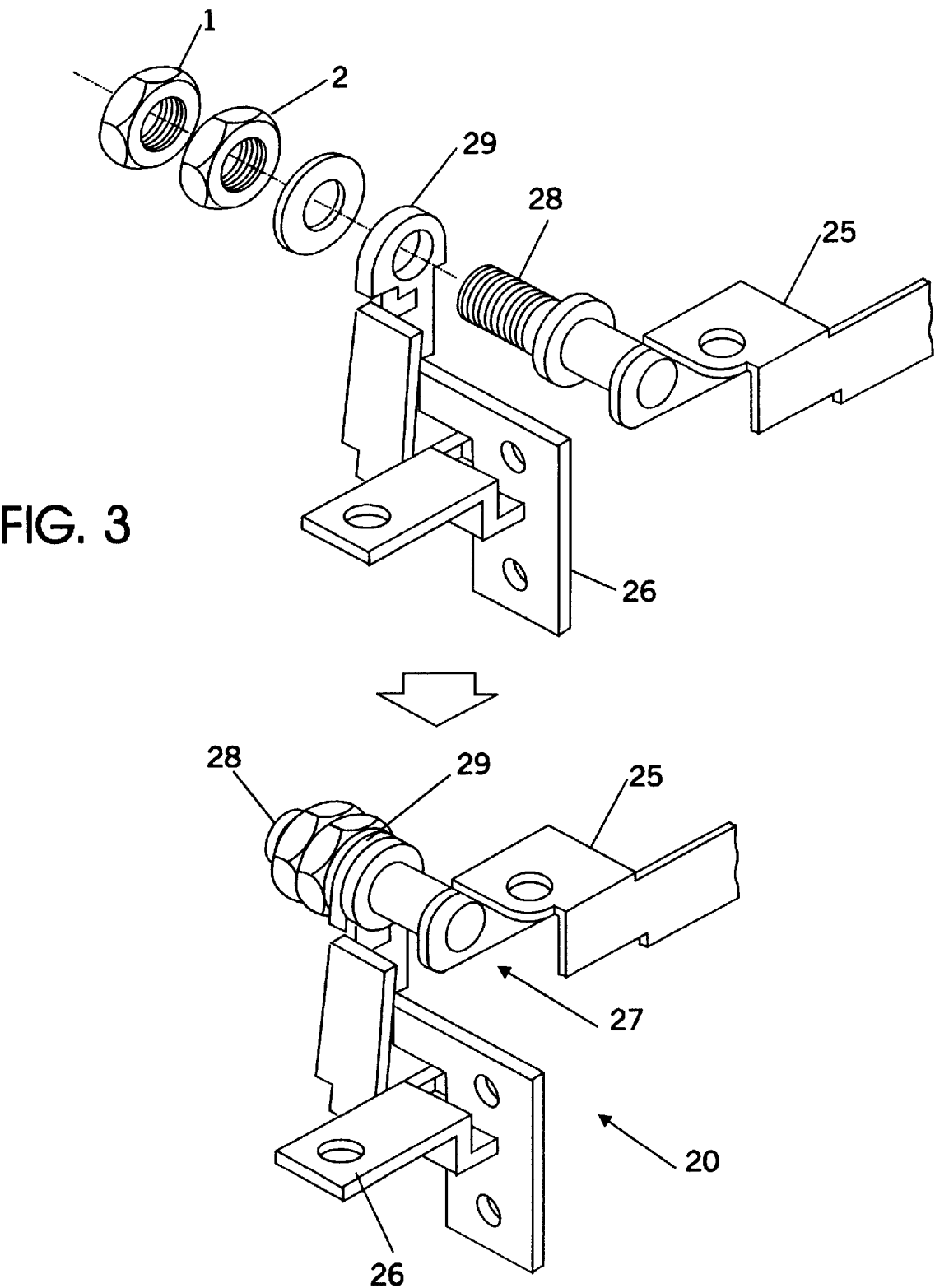
FIG. 3 is an enlarged diagram of the right hinge member 20.

FIG. 3 is an enlarged diagram of the right hinge member 20. The hinge member 20 includes an upper bracket 25 to be attached to the right side of the LCD unit 10; a lower bracket 26 to be attached to the main body of a notebook computer (not shown); a hinge joint 27 that hinges the brackets 25 and 26 at a predetermined rotational torque; and a shaft 28 integrally formed with the upper bracket 25. Since the upper portion of the upper bracket 25 to be attached to the LCD unit 10 has already been explained, it is not shown in FIG. 3 any more. Although the left hinge member 30 will not be explained, it should be understood that it is symmetrical in shape and structure with the right hinge member 20.

The shaft 28 and the upper bracket 25 are integrally formed by fitting the shaft 28 into an opening that has almost the same diameter and that is formed in the lower end of the upper bracket 25. A ring portion 29 extended radially is fitted at the center of the shaft 28.

Predetermined threads are formed at the other end of the shaft 28. Further, from this end, the lower bracket 26, a washer, a nut 2 and a nut 1 are fitted in the named order to the shaft 28. The washer is pushed backward in accordance with the volume the nut 2 is tightened, and friction is exerted between the lower bracket 26 and the ring portion 29. Therefore, when the nut 2 is secured at a predetermined location, it is possible to adjust the rotational torque of the lower bracket 26 relative to the shaft 28, i.e., the rotational torque when the lid member is opened and closed relative to the notebook computer. Furthermore, when the nut 1 is engaged from the outside, the nut 2 is secured at the determined location.

Figure 4:
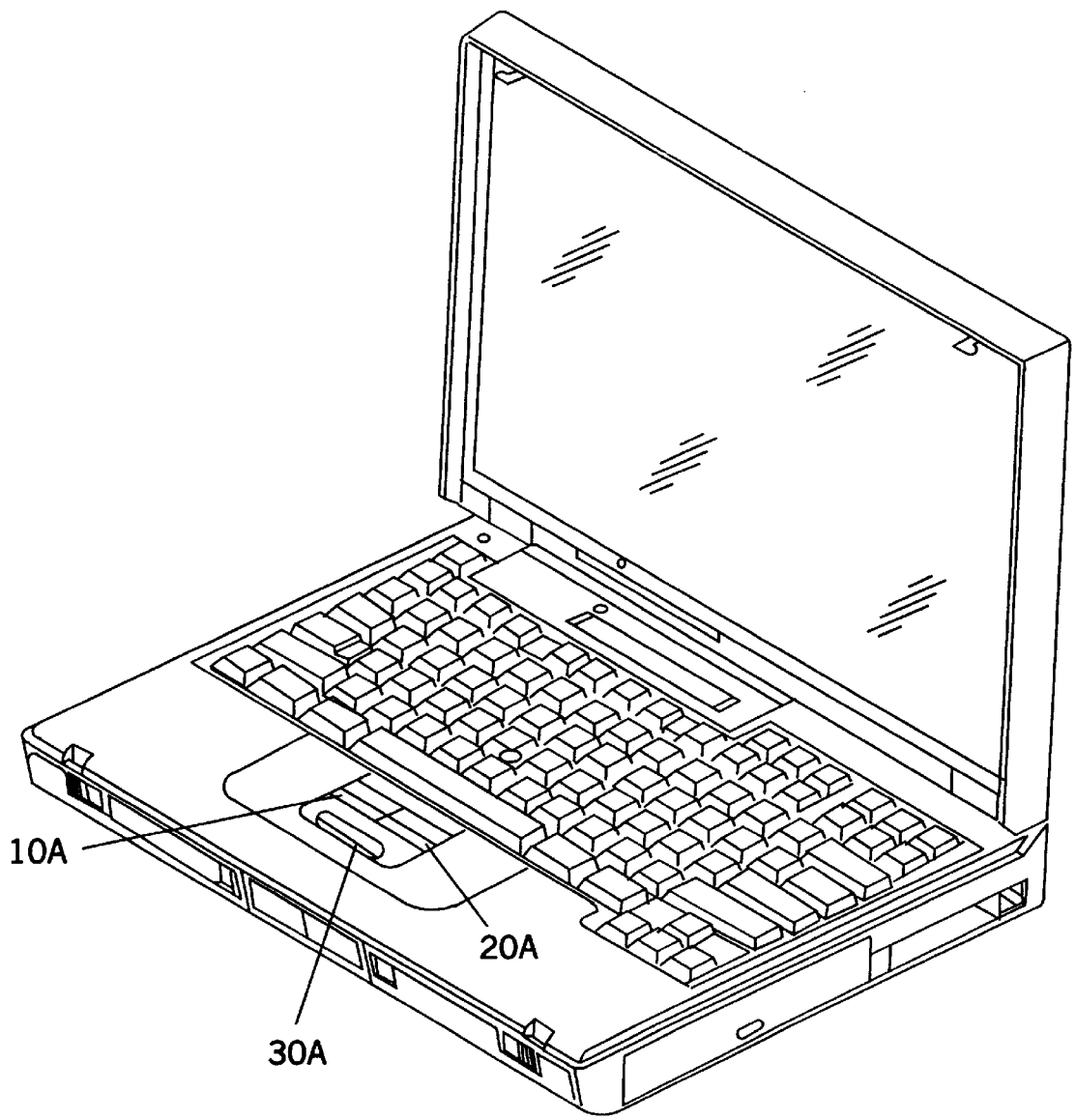
FIG. 4 shows the external appearance of a notebook computer in which the liquid crystal display assembly 100 of the present inventions is mounted.
Figure 5:
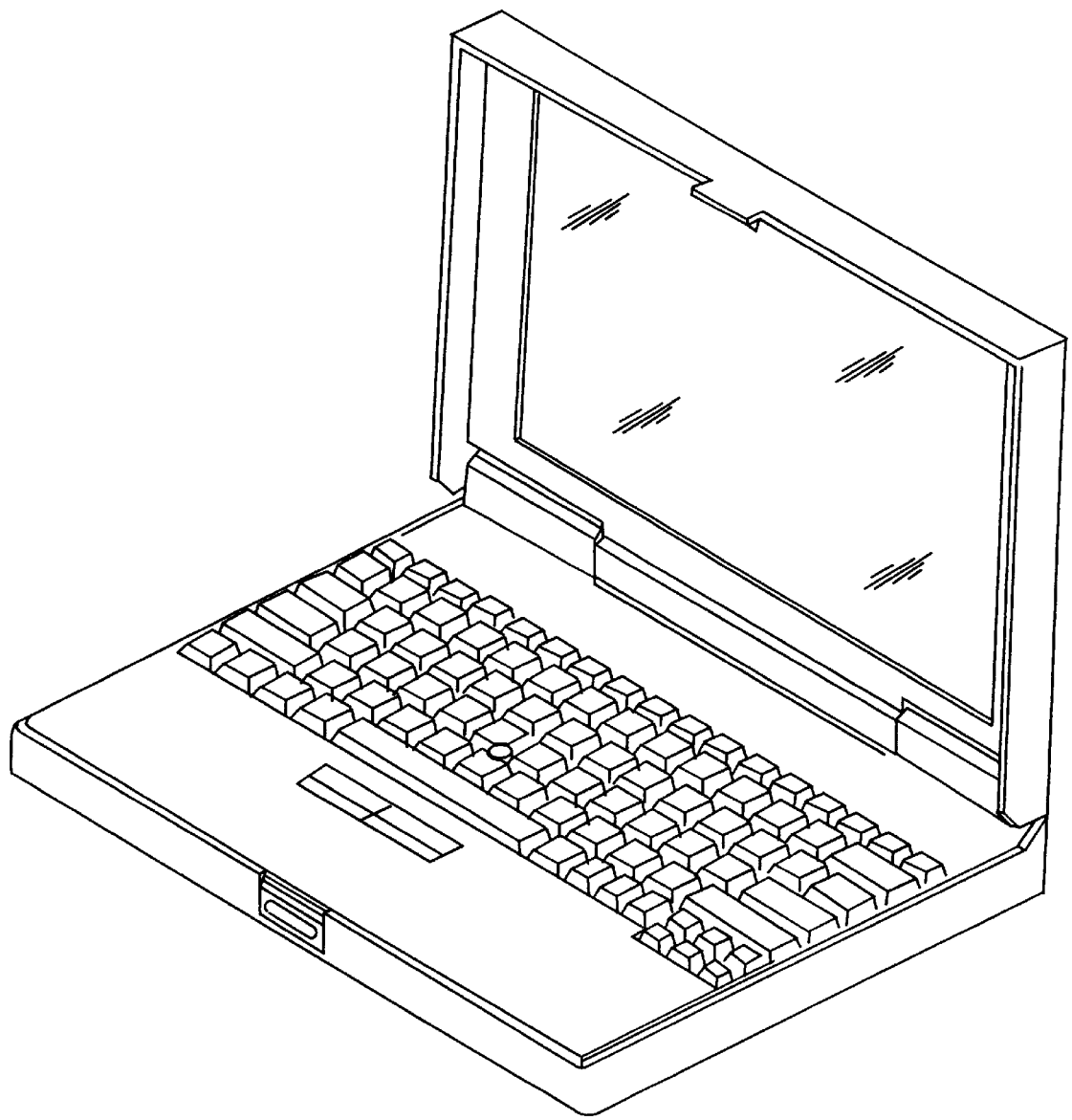
FIG. 5 shows the general form of the external appearance of a notebook computer.
Figure 6:
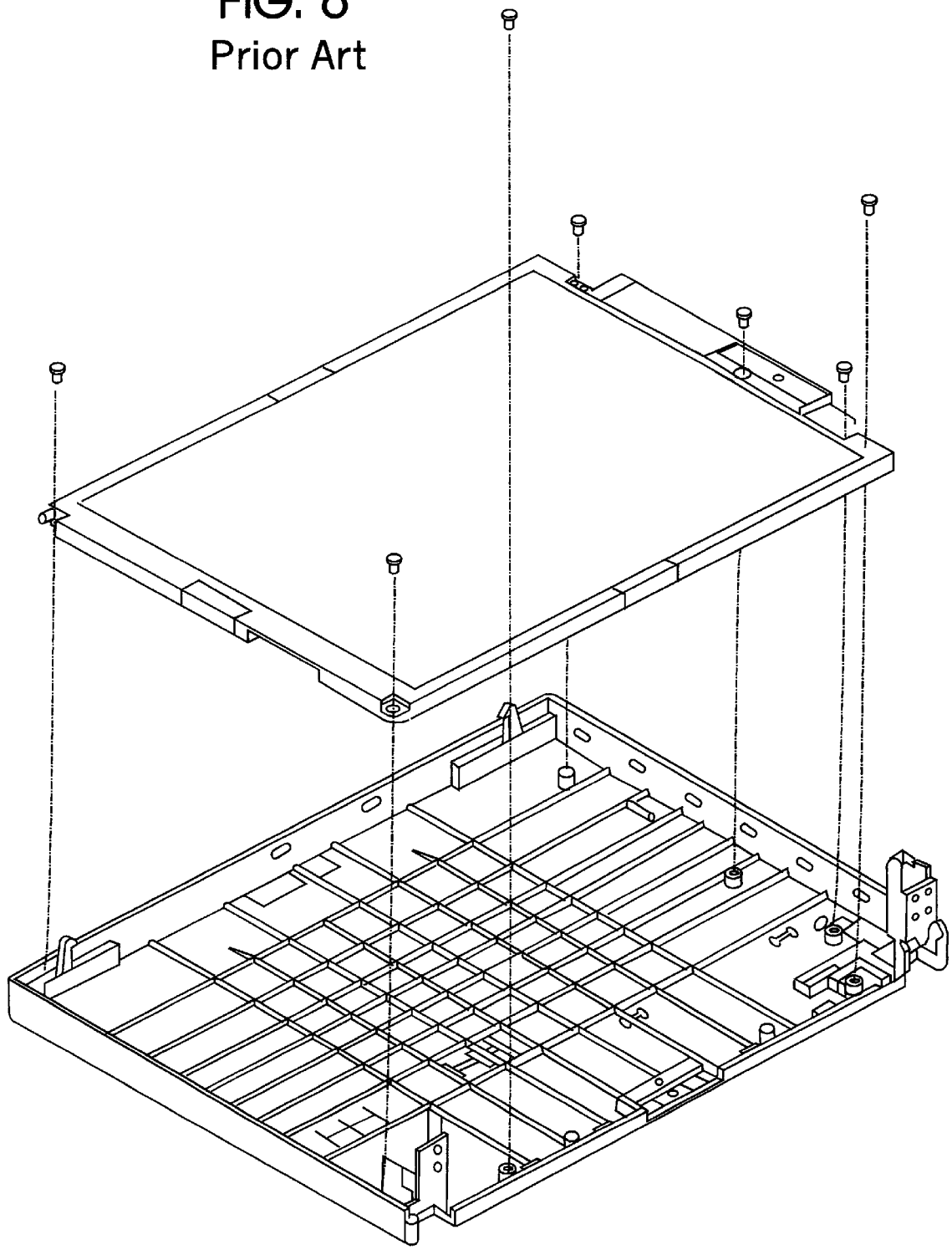
FIG. 6 illustrates the assembly structure of the lid member of the notebook computer.

For reference, the external appearance of a notebook computer embodying the LCD assembly 100 of the present invention is shown in FIG. 4. It should be fully understood that the size of the rear cover (the external frame of the lid member) is near that of the LCD unit.

The present invention has been described in detail while referring to a specific embodiment. However, it should be obvious to one having ordinary skill in the art that various modifications or revisions of the embodiment are possible within the scope of the present invention. That is, although only one embodiment of the present invention has been disclosed, it should be understood that the invention is not limited to that embodiment but encompasses the spirit and scope of the attached claims.

We claim:

1. A display assembly rotatably hinged upon the main body of an information processing apparatus, comprising:
    a liquid crystal display unit having a flat display panel with a display face;
    a plurality of screw securing portions provided on both a right and a left side of said liquid crystal display unit for the receipt of screws so that the threaded shafts of the screw are parallel to the plane of the display face;
    a pair of spaced brackets aligned with the right and left sides of said liquid crystal display unit and having through holes formed at locations corresponding to said screw securing portions;
    a pair of hinge members, each hinge member having one end fixed to the lower end of one said brackets and the other end rotatably coupled to the main body of said information processing apparatus;
    a rear cover for covering the brackets and a rear face of said liquid crystal display unit,
    a right and a left sidewall of the rear cover containing through holes formed in a location corresponding to at least one of said screw securing portions on the right and left side of said liquid crystal display unit; and
    a plurality of screws passing through the through holes in the brackets and the rear cover and into the screw securing portions with threaded shafts of the screws aligned parallel to the plane of the display face to thereby attach the brackets and the rear cover to the liquid crystal display unit.

2. The display assembly of claim 1, where certain of the plurality of screws attached both the brackets and the rear cover to the liquid crystal display unit while other of the plurality of screws attach only the brackets to the liquid crystal display unit.

3. An information processing apparatus having a main body for accommodating electronic components and a lid member rotatably hinged at one edge of said main body, said lid member comprising:
    a liquid crystal display unit having a flat display face and a thin frame containing a plurality of screw securing portions on a right and a left side of said liquid crystal display unit;
    a pair of brackets aligned with the right and left sides of said liquid crystal display unit and having through holes formed at locations corresponding to said screw securing portions;
    a pair of hinge members, each hinge member having one end fixed to the lower end of one of said brackets and the other end rotatably coupled to the main body of said information processing apparatus;
    a rear cover for covering a rear face of said liquid crystal display unit,
    a through hole formed in a location corresponding to at least one of said screw securing portions on the right and left side of said liquid crystal display unit; and
    a plurality of screws passing through the through holes in the brackets and rear cover and into the screw securing portions with threaded shafts of the screws aligned parallel to the plane of the display face to attach the brackets and the rear cover to the liquid crystal display unit.

4. The information processing apparatus of claim 3, wherein certain of the plurality of screws attach both the brackets and the rear cover to the liquid crystal display unit while other of the plurality of screws attach only the brackets to the liquid crystal display unit.

5. An information processing apparatus having a main body for accommodating electronic components and a lid member rotatably hinged at one edge of said main body, said lid member comprising:
    a liquid crystal display unit having a flat display face;
    a plurality of screw securing portions provided on the right and left sides of said liquid crystal display unit;
    a pair of brackets to be screwed to the right and left sides of said liquid crystal display unit and having through holes formed at locations corresponding to said screw securing portions;
    a pair of hinge members, each hinge member having one end fixed to the lower end of said bracket and the other end rotatably coupled to the main body of said information processing apparatus;
    a rear cover for covering a rear face of said liquid crystal display unit to which said brackets are attached;
    a through hole formed in a location corresponding to at least one of said screw securing portions on the right and left side of said rear cover; and
    a plurality of screws with threaded shafts of the screws passing through the through holes in the brackets and the rear cover and into the screw securing portion with threaded shafts of the screws aligned parallel to the display face to attach the brackets and the rear cover to the liquid crystal display unit.

6. An information processing apparatus having a main body for accommodating electronic components and a lid member rotatably hinged at one edge of said main body, said lid member comprising:
    a liquid crystal display unit having a flat display face and a right and a left side substantially perpendicular to the face;
    a pair of bracket arms hinged for rotation relative to the main body one against the right side of the liquid crystal display and the other against the left side of the display;
    a box-shaped rear cover with side walls for covering said liquid crystal display unit, said liquid crystal display unit being secured to the bracket arms and side walls of said rear cover by screws with their threaded shafts aligned parallel to the display face of the display unit wherein two cylindrical shafts each fixed to one of the bracket arms and facing towards each other across a back of the liquid crystal display unit; and
    two lower brackets each mounted for rotation on one of the cylindrical shafts for connection to the main body to allow the lid member to pivot with respect to the main body.

7. The information processing apparatus according to one of claim 6, wherein a keyboard unit having a plurality of keys is provided on the top face of said main body.

8. The information processing apparatus of claim 7, wherein certain of said screws attach both the brackets and the rear cover to the liquid crystal display unit while other of the screws attach only the brackets to the liquid crystal display unit.

9. The information processing apparatus of claim 8, wherein said liquid crystal display unit includes a thin frame surrounding the liquid crystal display unit, said frame having screw securing portions for the receipt of the screws.

* * * * *